(12) United States Patent
Shimokawa

(10) Patent No.: US 10,131,385 B2
(45) Date of Patent: Nov. 20, 2018

(54) AERODYNAMIC DEVICE

(71) Applicant: TOYOTA JIDOSHA KABUSHIKI KAISHA, Toyota-shi (JP)

(72) Inventor: Shinnosuke Shimokawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/583,030

(22) Filed: May 1, 2017

(65) Prior Publication Data

US 2017/0327160 A1    Nov. 16, 2017

(30) Foreign Application Priority Data

May 12, 2016 (JP) ................. 2016-095742

(51) Int. Cl.
  *B62D 35/00* (2006.01)
(52) U.S. Cl.
  CPC ........... *B62D 35/00* (2013.01); *B62D 35/007* (2013.01); *B62D 35/008* (2013.01)
(58) Field of Classification Search
  CPC .... B62D 35/007; B62D 35/008; B62D 37/02; B62D 35/00
  USPC .............. 296/180.1–180.5; 180/903
  See application file for complete search history.

(56) References Cited

U.S. PATENT DOCUMENTS

| | | | | |
|---|---|---|---|---|
| 4,082,340 A | * | 4/1978 | Taylor ................. | B62D 35/001 105/1.2 |
| 4,925,236 A | * | 5/1990 | Itoh ...................... | B62D 35/007 296/180.1 |
| 5,013,080 A | * | 5/1991 | Garrone ................ | B62D 37/02 296/180.1 |
| 5,544,931 A | | 8/1996 | Nelson | |
| 6,039,385 A | * | 3/2000 | Husted ................. | B62D 35/001 296/180.3 |
| 7,055,891 B2 | * | 6/2006 | Jungert ................ | B62D 35/005 296/180.5 |
| 8,308,222 B2 | * | 11/2012 | Ondracek ............. | B62D 37/02 296/180.1 |

FOREIGN PATENT DOCUMENTS

| | | |
|---|---|---|
| JP | 9-511466 | 11/1997 |
| JP | 2006-168636 | 6/2006 |

* cited by examiner

*Primary Examiner* — Dennis H Pedder
(74) *Attorney, Agent, or Firm* — Oblon, McClelland, Maier & Neustadt, L.L.P.

(57) ABSTRACT

An aerodynamic device provided as a plate-shaped body attached to a roof or a side wall of a vehicle includes means configured to selectively raise ribs arranged in two directions from a surface portion of the plate-shaped body in a switching manner between the two directions.

6 Claims, 6 Drawing Sheets

FIG. 2
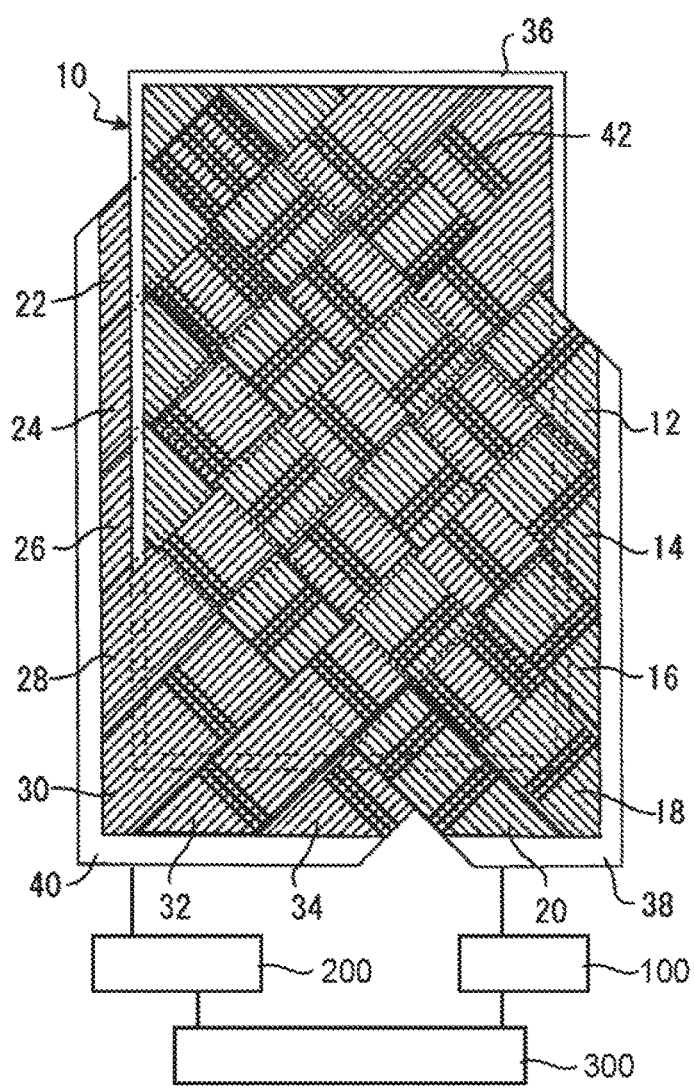
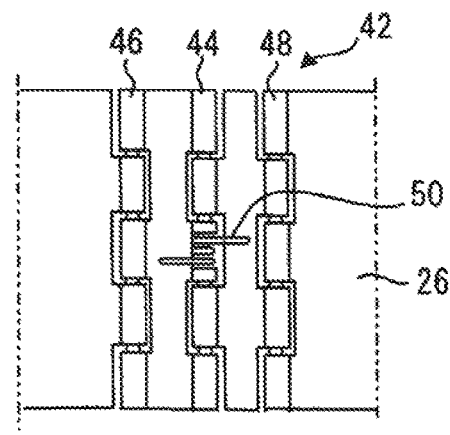
FIG. 3A
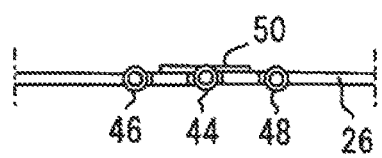
FIG. 3B

AERODYNAMIC DEVICE

INCORPORATION BY REFERENCE

The disclosure of Japanese Patent Application No. 2016-095742 filed on May 12, 2016 including the specification, drawings and abstract is incorporated herein by reference in its entirety.

BACKGROUND

1. Technical Field

The present disclosure relates to an aerodynamic device. More specifically, the present disclosure relates to a device that optimizes aerodynamic characteristics of a vehicle against a side wind, such as an anti-lift characteristic and an anti-yaw characteristic.

2. Description of Related Art

Published Japanese Translation of PCT Application No. 9-511466 (JP-T 9-5114661 describes as follows: in order to restrain a spin by more strongly pressing a rear part of an automobile against a road surface at the time when the automobile spins out at a high speed, a rear part of a roof of the automobile is configured such that a part of a rectangular shape of a board member forming a contour surface of the roof is raised by a hinge appropriately so as to receive a travel wind as an air deflector to generate a force to press the rear part of the automobile downward. A pair of air deflectors are placed side by side in a vehicle width direction and have such a posture that each of the air deflectors is provided so as to be inclined relative to the vehicle width direction such that its outer end in the vehicle width direction is biased toward a vehicle front side relative to its inner end, so that the pair of air deflectors enclose the travel wind blowing from a front side of the vehicle. Further, Japanese Patent Application Publication No. 2006-168636 (JP 2006-168636 A) describes that a wing member extending in a vehicle width direction on a roof of an automobile and configured to change an angle of attack with respect to a travel wind from a vehicle front side is provided movably in a vehicle longitudinal direction, and a lengthwise position of such a wing member and the angle of attack are controlled depending on a vehicle travel state, so as to achieve improvement of stability of vehicle travel.

SUMMARY

When a side wind blows during travel of a vehicle, a vector of a travel wind and a vector of the side wind are added. On this account, a flow velocity of an air stream flowing along a roof or a side wall of the vehicle with respect to a surface of the roof or the side wall may become very fast. When the air stream with such a fast flow velocity flows along a smooth surface of the roofer the side wall of the vehicle, a negative pressure is generated thereon. Due to the negative pressure applied to the roof or the side wall of the vehicle, a vertical load of the vehicle is reduced or a yawing moment is applied to the vehicle, which may affect traveling characteristics.

The present disclosure provides an aerodynamic device for aerodynamic characteristics of a vehicle against a side wind, such as an anti-lift characteristic and an anti-yaw characteristic.

A first aspect of the present disclosure provides an aerodynamic device provided as a plate-shaped body attached to a roof or a side wall of a vehicle. The aerodynamic device includes means configured to selectively raise ribs arranged in two directions from a surface portion of the plate-shaped body in a switching manner between the two directions.

A second aspect if the present disclosure provides an aerodynamic device. The aerodynamic device includes a body portion provided as a plate-shaped body attached to a roof or a side wall of a vehicle, the body portion including ribs arranged along two directions on a surface portion of the body portion; and means configured to selectively raise the ribs. The ribs may be provided so as to extend from a middle of the roof of the vehicle to a rear part of the roof. A sheet material made of an elastic body may be provided in a stretched manner on surfaces of the ribs.

As described above, the device provided as the plate-shaped body attached to the roof or the side wall of the vehicle includes the means that selectively raises the ribs arranged in respective directions from the surface portion in a switching manner between the two directions. Accordingly, if such a device is attached to the roof or the side wall of the vehicle so that the ribs are raised appropriately depending on the intensity of the side wind, it is possible to prevent generation of a negative pressure such that an air stream flowing along the roof or the side wall of the vehicle is disturbed by the ribs, thereby making it possible to restrain traveling stability from being unpaired due to a reduction of a vertical load of the vehicle by the side wind or due to application of a yawing moment to the vehicle. In this case, an air stream obtained by adding a vector of the side wind to a vector of the travel wind of the vehicle blows from a diagonal left front side or a diagonal right front side depending on a direction of the side wind. Accordingly, particularly in a roof part of the vehicle, a direction of the air stream flowing along the roof part greatly changes right and left frequently. However, if an arrangement direction of the ribs thus raised is switched between the two directions, it is possible to optimize the arrangement direction of the ribs thus raised according to the direction of the side wind.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a plan view illustrating the aerodynamic device in a state where any ribs in two directions are not raised;

FIG. 3A is a plan view illustrating a state where one of the ribs is not raised;

FIG. 3B is a side view illustrating a state where one of the ribs is not raised;

DETAILED DESCRIPTION OF EMBODIMENTS

Figure 1:
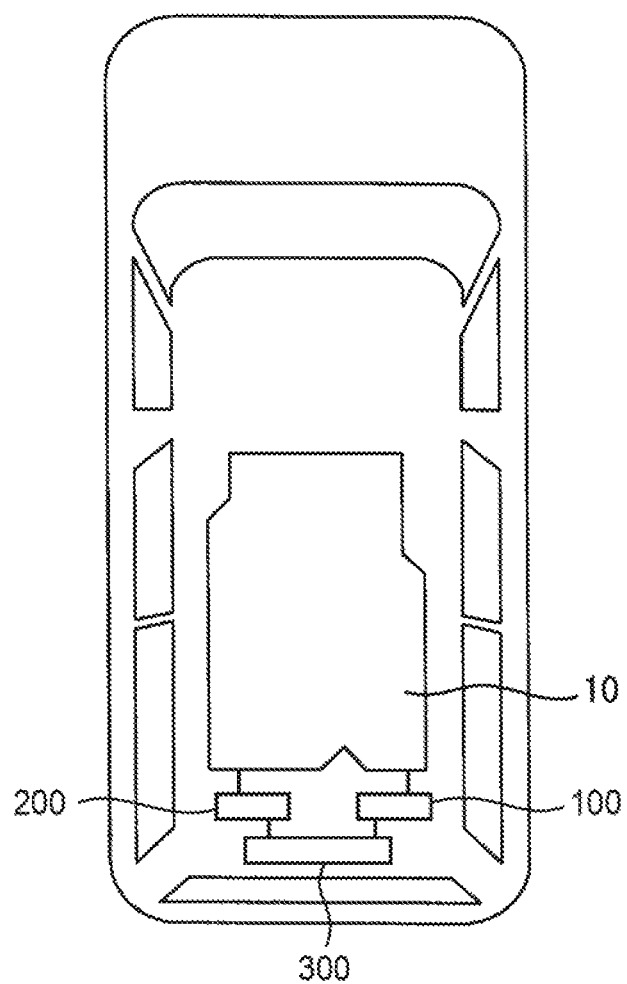
FIG. 1 is a plan view illustrating an example in which an aerodynamic device according to one embodiment of the disclosure is provided on a roof of a vehicle.

FIG. 1 is a plan view illustrating an example in which an aerodynamic device according to one embodiment of the disclosure is provided on a roof of a vehicle. In FIG. 1, an aerodynamic device 10 is provided so as to form a plate-shaped body and extend from a middle of the roof of the vehicle to a rear part thereof.

As illustrated in FIG. 2, the aerodynamic device 10 has a structure in which strips 12, 14, 16, 18, 20 that form ribs that should be raised when an air stream caused by a vector sum of a travel wind of the vehicle and a side wind blows toward the vehicle from a diagonal left front side and strips 22, 24, 26, 28, 30, 32, 34 that form ribs that should be raised when an air stream caused by a vector sum of the travel wind of the vehicle and a side wind blows toward the vehicle from a diagonal right front side are woven in an intersected manner. One ends of these strips are fixed to a rectangular fixed frame body 36.

The other ends of the strips 12, 14, 16, 18, 20 are fixed to an L-shaped movable frame body 38. The other ends of the strips 22, 24, 26, 28, 30, 32, 34 are fixed to an L-shaped movable frame body 40. The movable flame body 38 can be moved by an actuator 100 in a direction from a state illustrated in FIG. 2 toward a left upper side in the figure. The movable frame body 40 can be moved by an actuator 200 in a direction from the state illustrated in FIG. 2 toward a right upper side in the figure. These actuators 100, 200 are controlled b a controller 300.

Figure 4A:
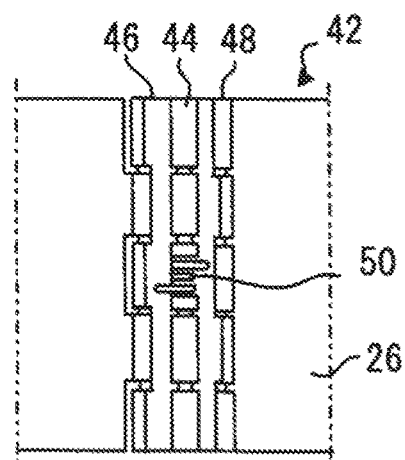
FIG. 4A is a plan view illustrating a state where one of the ribs is raised.
Figure 4B:
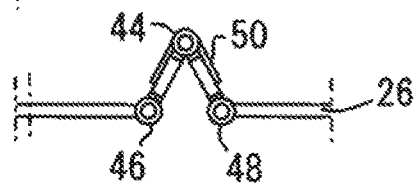
FIG. 4B is a side view illustrating a state where one of the ribs is raised.

The strip is configured such that three rib formation hinges in total are provided in exposed parts of the strip in a distributed manner over an extending direction of the strip. One of the rib formation hinges is indicated by a reference sign 42. As illustrated in FIGS. 3 and 4, the rib formation hinge such as the rib formation hinge 42 is provided so as to include, in part of the strip 26, for example, one pivot portion 44 to be folded upward and two pivot portions 46, 48 provided along both sides of the pivot portion 44 so as to be folded downward. A clip spring 50 configured to bias the rib formation hinge from a non-raised state illustrated in FIG. 3 toward a raised state illustrated in FIG. 4 is incorporated into the pivot portion 44. When the one end of the strip is pushed toward the other end, the rib formation hinge is promoted to be raised by a biasing force of the clip spring 50 as illustrated in FIG. 4, so as to form a mound-shaped rib.

Figure 5:
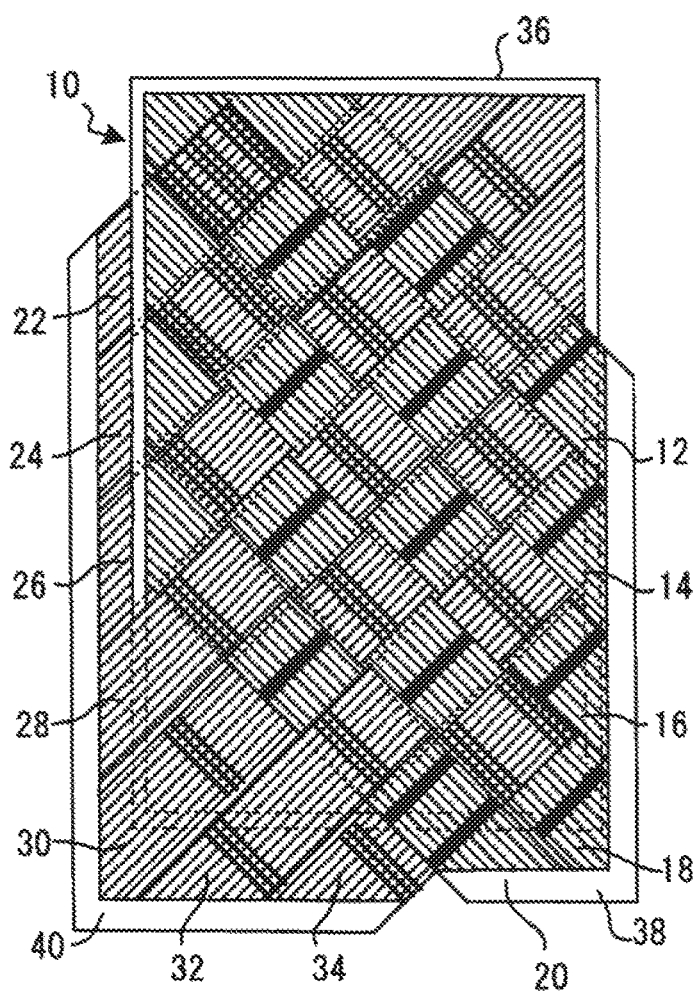
FIG. 5 is a plan view, similar to FIG. 2, illustrating the aerodynamic device in a state where its ribs are raised only in one direction.

FIG. 5 illustrates a state where the movable frame body 38 is driven toward a left upper direction in the figure relative to the fixed frame body 36 from the state illustrated in FIG. 2 and the rib formation hinges in the strips 12, 14, 16, 18, 20 are accordingly raised in a mound shape. This is an operation state of the device in a case where the air stream caused by the vector sum of the travel wind of the vehicle and the side wind blows toward the vehicle from the diagonal left front side.

Figure 6:
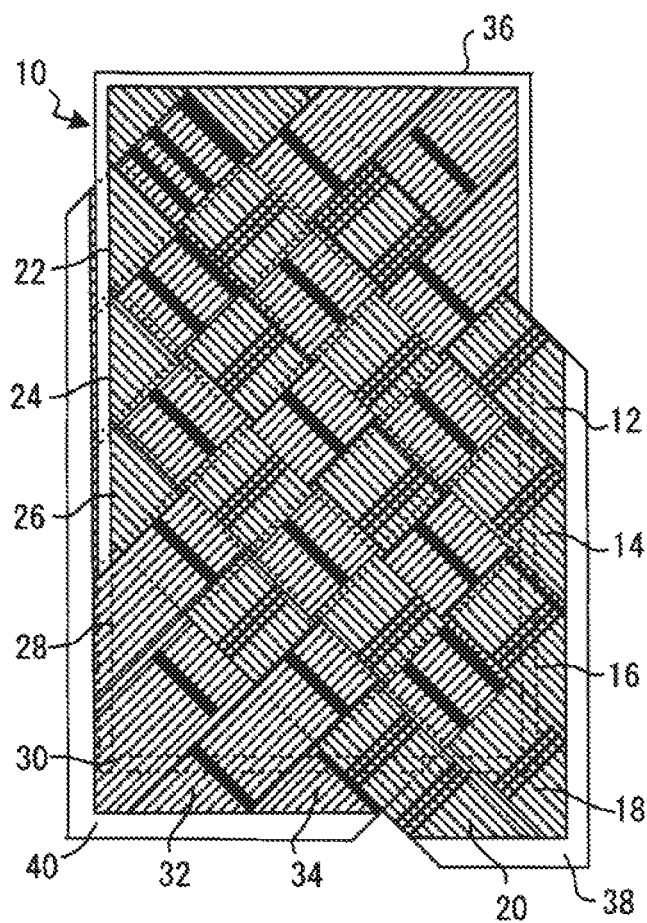
FIG. 6 is a plan view, similar to FIG. 2, illustrating the aerodynamic device in a state where its ribs are raised only in the other one direction.

FIG. 6 illustrates a state where the movable frame body 40 is driven toward a right tipper direction in the figure relative to the fixed frame body 36 from the state illustrated FIG. 2, and the rib formation hinges in the strips 22, 24, 26, 28, 30, 32, 34 are accordingly raised in a mound shape. This is an operation state of the device in a case where the air stream caused by the vector sum of the travel wind of the vehicle and the side wind blows toward the vehicle from the diagonal right front side.

Figure 9:
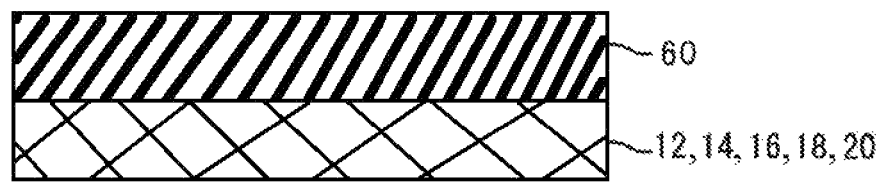
FIG. 9 is a schematic sectional view of an elastic body that is provided in a stretched manner on surfaces of the ribs.

The device may be configured such that the surfaces of the strips woven in an intersected manner are just exposed, or may be configured such that a flexible sheet material, such as a rubber sheet, elastically deformable in longitudinal and width directions may be provided in a stretched manner on the strips thus woven in an intersected manner. FIG. 9 shows a schematic sectional view of an elastic body 60 that is provided in a stretched manner on surfaces of the ribs in one non-limiting illustrative example. In a case where such a sheet material is provided in a stretched manner, when the rib formation hinges are raised to form mound-shaped ribs, the surface of the device is in such a state where parts between adjacent mound-shaped ribs are smoothly recessed in a valley shape with parts corresponding to the mound-shaped ribs being taken as apexes of respective protrusions.

Figure 7:
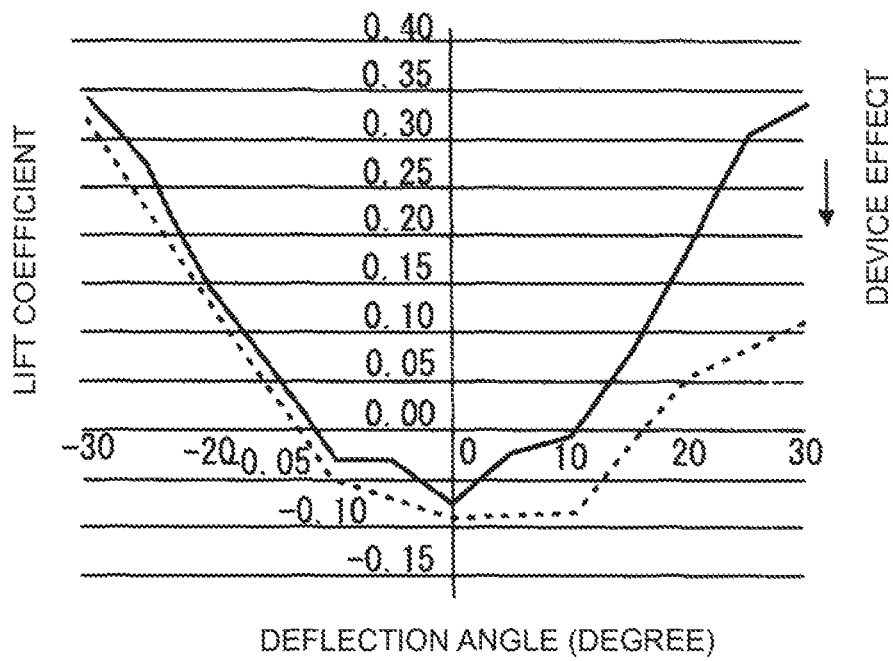
FIG. 7 is a graph illustrating an example of an experimental result of a lift restraint effect of the aerodynamic device according to the embodiment of the disclosure.

FIG. 7 illustrates an example of an experimental result of a lift restraint effect (a device effect) of the aerodynamic device according to the present disclosure in terms of a lift coefficient with respect to a deflection angle. The deflection angle is an angle of a direction of the vector sum of the travel wind of the vehicle and the side wind with respect to the vehicle longitudinal direction, and the lift coefficient is a zero-order coefficient obtained by comparing a lift caused by the wind with a geometrically calculated value. A characteristic line indicated by a solid line in the figure shows a value in a case where the device of the present disclosure is not provided, and a characteristic line indicated by a broken line shows an effect of the device of the present disclosure. In this case, a value of the lift coefficient with respect to a positive deflection angle is a value obtained when the ribs of the device are set with respect to a side toward which the side wind blows, and a value of the lift coefficient, indicated by the broken line, with respect to a negative deflection angle is a value obtained when the ribs of the device are set with respect to a side wind toward an opposite side to the above side-wind blowing side.

Figure 8:
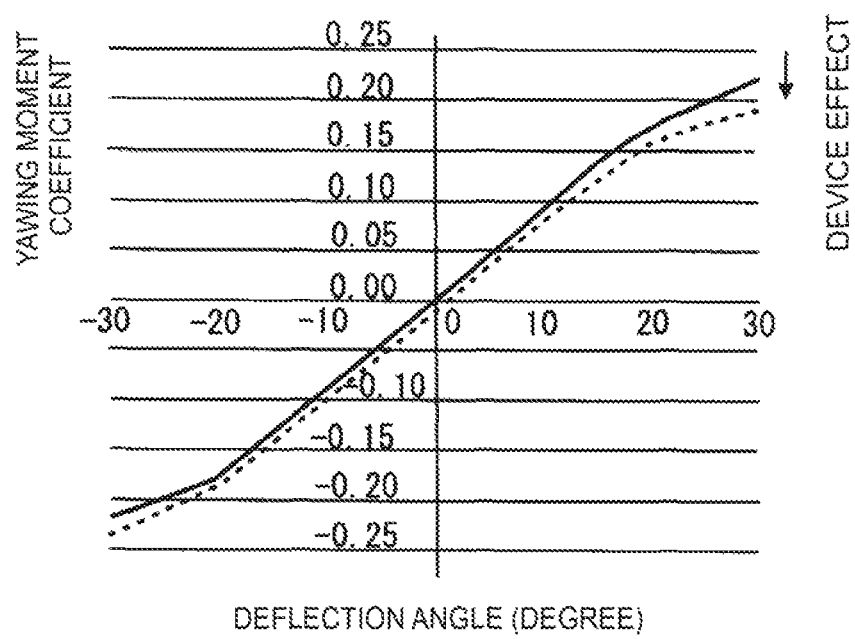
FIG. 8 is a graph illustrating an example of an experimental result of a yaw restraint effect of the aerodynamic device according to the embodiment of the disclosure.

FIG. 8 illustrates an example of an experimental result of a yaw restraint effect (a device effect) of the aerodynamic device according to the present disclosure in terms of a yawing moment coefficient with respect to a deflection angle. The yawing moment coefficient is a zero-order coefficient obtained by comparing a yawing moment caused by a side wind with a geometrically calculated value. Similarly, in the figure, a characteristic line indicated by a solid line shows a value in a case where the device of the present disclosure is not provided, and a characteristic line indicated by a broken line shows an effect of the device of the present disclosure. A value of the yawing moment coefficient, indicated by the broken line, with respect to a positive deflection angle is a value obtained when the ribs of the device are set with respect to a side where the side wind blows, and a value of the yawing moment coefficient, indicated by the broken line, with respect to a negative deflection angle is a value obtained when the ribs of the device are set with respect to a side wind toward an opposite side to the above side-wind blowing side.

The embodiment of the present disclosure has been described above in detail, but it is obvious to those skilled in the art that, the above embodiment is variously modifiable within the scope of the invention.

What is claimed is:

1. An aerodynamic device provided as a plate-shaped body attached to a roof of a vehicle, comprising:
    an actuator to selectively raise ribs from a surface portion of the plate-shaped body in a switching manner between two directions, first ribs among the ribs being arranged in first rows that are inclined with respect to a vehicle longitudinal direction and that approach a first end of the vehicle in a vehicle width direction as the first rows extend toward a rear of the vehicle, and second ribs among the ribs being arranged in second rows that are inclined with respect to the vehicle longitudinal direction and that approach a second end of the vehicle in the vehicle width direction as the second rows extend toward the rear of the vehicle, wherein
    the ribs are provided so as to extend from a middle of the roof of the vehicle to a rear part of the roof.

2. The aerodynamic device according to claim 1, wherein a sheet material made of an elastic body is provided in a stretched manner on surfaces of the ribs.

3. An aerodynamic device comprising:
    a body portion provided as a plate-shaped body attached to a roof or a side wall of a vehicle, the body portion including ribs arranged along two directions on a surface portion of the body portion, first ribs among the ribs being arranged in first rows that are with respect to a vehicle longitudinal direction and that approach a first end of the vehicle in a direction perpendicular to the vehicle longitudinal direction as the first rows extend toward one end of the vehicle in the vehicle longitudinal direction, and second ribs among the ribs being arranged in second rows that are inclined with respect to the vehicle longitudinal direction and that approach a second end of the vehicle in the direction perpendicular to the vehicle longitudinal direction as the second rows extend toward the one end of the vehicle in the vehicle longitudinal direction; and
    an actuator to selectively raise the ribs, wherein
    a sheet material made of an elastic body is provided in a stretched manner on surfaces of the ribs.

4. The aerodynamic device according to claim 1, further comprising:
    a controller configured to control the actuator to selectively raise the ribs from the surface portion of the plate-shaped body in the switching manner between the two directions.

5. The aerodynamic device according to claim 2, further comprising:
    a controller configured to control the actuator to selectively raise the ribs from the surface portion of the plate-shaped body in the switching manner between the two directions.

6. The aerodynamic device according to claim 3, further comprising:
    a controller configured to control the actuator to selectively raise the ribs.

* * * * *